April 22, 1952 W. G. KAMMLADE, JR 2,594,177
SHEARING, CUTTING, AND TRIMMING DEVICE
Filed Dec. 23, 1949 2 SHEETS—SHEET 1
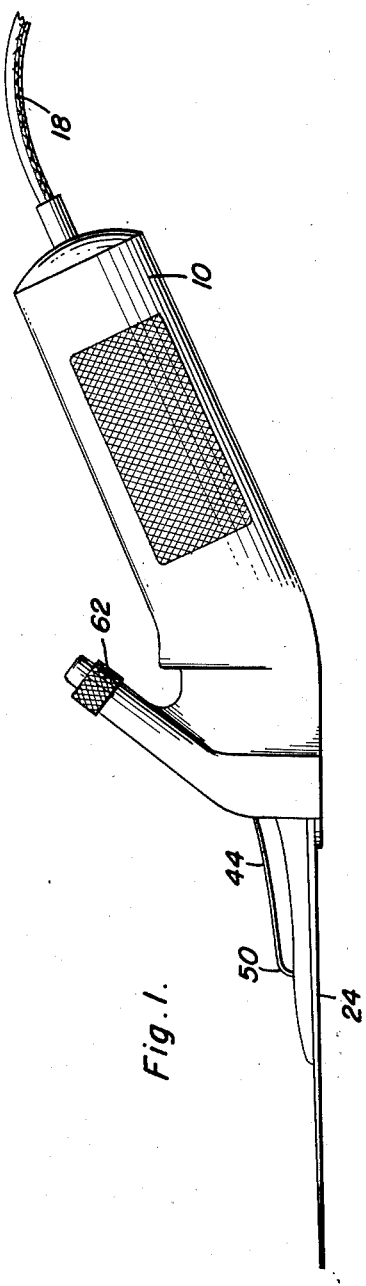
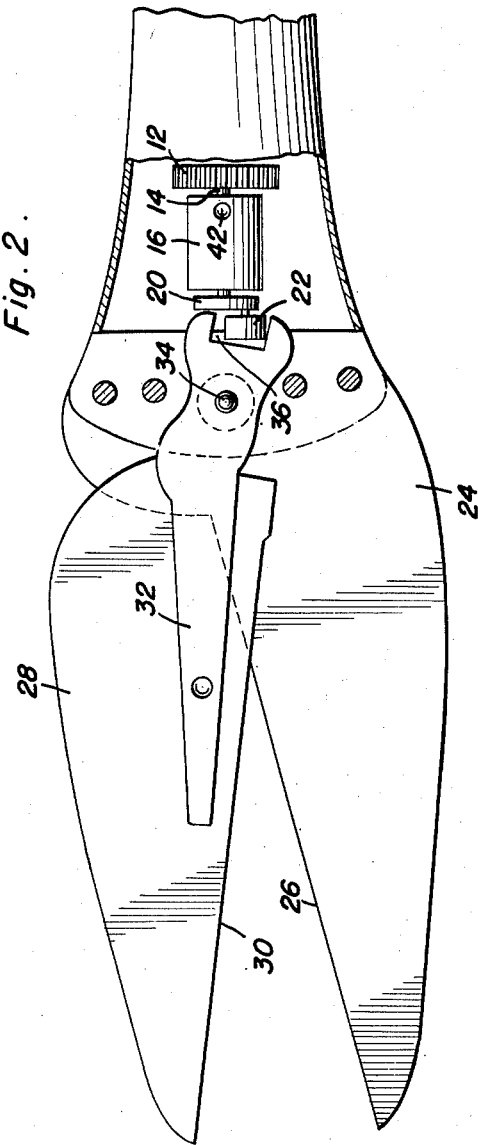
Inventor
William G. Kammlade, Jr.
By *Clarence A. O'Brien and Harvey B. Jacobson*
Attorneys April 22, 1952 W. G. KAMMLADE, JR 2,594,177
SHEARING, CUTTING, AND TRIMMING DEVICE
Filed Dec. 23, 1949 2 SHEETS—SHEET 2
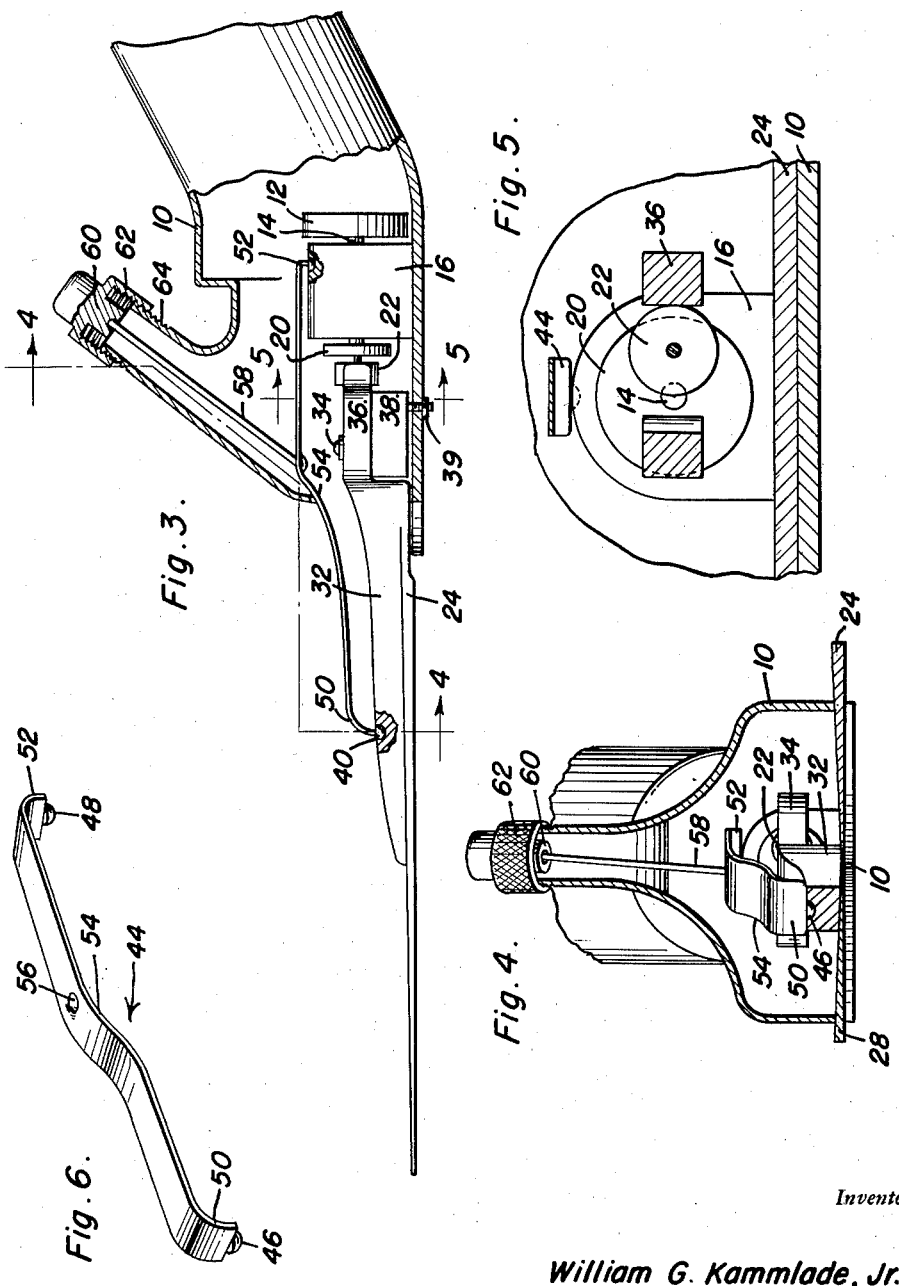
Inventor
William G. Kammlade, Jr.
By Clarence A. O'Brien
and Harvey B. Jacobson
Attorneys

UNITED STATES PATENT OFFICE 2,594,177

SHEARING, CUTTING, AND TRIMMING DEVICE

William G. Kammlade, Jr., Urbana, Ill., assignor of one-half to William G. Kammlade, Sr., Urbana, Ill.

Application December 23, 1949, Serial No. 134,635

1 Claim. (Cl. 30—249)

This invention relates to automatic shears, and more particularly to a shearing, cutting, and trimming device adapted to be used in trimming the fleece of sheep and other animals.

An object of the invention is to provide an automatic shears adapted to be used for cutting, trimming, and shearing the fleece of sheep and other animals in addition to uses as a grass and hedge trimmer and for cutting various materials.

A further object of the invention resides in the provision of a means for selectively determining the pressure imparted upon a movable blade relative to a fixed blade secured to the casing of the device.

Yet another object resides in the provision of a pressure regulating lever operatively controlled by a tension pin having a knob on the end thereof. Upon actuation of the knob the pressure regulating lever will selectively impart a desired pressure to the operating lever connected to the movable blade of the device.

Still further objects reside in the provision of an automatic shears that is strong, durable, highly efficient in operation, compact in construction and convenient to use, simple in construction and manufacture, pleasing in appearance, and quite inexpensive.

These, together with the various ancillary objects of the invention, which will later become apparent as the following description proceeds, are attained by this shearing, cutting and trimming device, a preferred embodiment of which has been illustrated by way of example only, in the accompanying drawings, wherein:

Figure 1 is a side elevational view of the device for shearing, cutting and trimming;

Figure 2 is a top plan view of the device, parts being shown in section, and other parts comprising the aforesaid pressure regulating lever being removed to show other parts in greater detail;

Figure 3 is a vertical sectional view as taken in a view similar to that of Figure 1 and showing the operating mechanisms of the device in great detail;

Figure 4 is a vertical sectional view as taken along line 4—4 in Figure 3;

Figure 5 is another vertical sectional view this time taken along line 5—5 in Figure 3; and, Figure 6 is a perspective view of the pressure regulating lever comprising one element of the present invention.

With continuing reference to the accompanying drawings, wherein like reference numerals designate similar parts throughout the various views, reference numeral 10 generally designates a casing in which an electric motor, not shown, is operatively connected to driven gear 12 which is connected to shaft 14 journaled in bearing element 16 secured to the casing. An extension cord 18 is provided for connecting the electric motor to the source of electrical power. The shaft 14 is provided with the conventional balance wheel 20 and an eccentric 22 is rigidly secured to the balance wheel 20.

Secured to the casing 10 is a fixed cutting blade 24. The cutting blade 24 is of conventional configuration and has the usual cutting edge 26. A movable blade 28 having a cutting edge 30 is positioned so as to overlie the cutting blade 24. Additionally, the cutting blade 28 is rigidly secured to an operating lever 32 which is pivotally secured by means of pivot pin 34 to the casing.

The operating lever 32 is provided with a recess 36 therein adapted to encompass the eccentric 24 which upon rotation of the shaft 14 will cause the cam surface formed by the periphery of the eccentric 22 to engage the lever 32 to actuate the movable blade 28 with respect to the fixed blade 24 in a reciprocating manner.

As seen best in Figure 3, the operating lever 32 is provided with a portion thereof designated by numeral 36 which provides a satisfactory recess for a bearing 38 to be positioned between the operating lever 32 and the fixed blade 24. The bearing surface of bearing 38 is so constructed as to allow the operating lever 32 to pivot about pivot pin 34 with a minimum of friction.

An elongation of bearing 38 together with a set screw and lock nut 39 provide an additional blade pressure regulating mechanism. The set screw operates through a threaded hole in the casing 10 and may be locked in position by a lock nut or other suitable means. Turning this screw to raise the back part of the bearing 38 will tilt blade 28 and thus increase pressure at the cutting edge and toward the tip of the blades.

The operating lever 32 is provided with a bearing recess as is the bearing element 16 which has a similar hemisphere 42. As best shown in Figures 3 and 6, a pressure regulating lever 44 is provided which has ball bearings 46 and 48 secured at its downwardly turned ends 50 and 52. Additionally, the pressure regulating lever 44 is provided with a step 54 for providing the spring tension and is also provided with a recess 56 for the reception of a pressure pin 58 connected therein.

The other end of the pressure pin 58 is pivotally connected to the knob 60 of a cap 62 which is internally threaded and adapted to be selectively screwed on the threaded cylinder 64 forming a portion of the casing 10. The knob 60 is internally secured within the cap 62 which is knurled on its exterior to provide a grasping surface of desired characteristics.

As can be readily seen, the cam surface formed by the eccentric 22 oscillates the operating lever 32 in a reciprocating manner so as to actuate the movable cutter blade 28 relative to the stationary or rigid cutting blade 24. By selected rotation of the cap 62, the pin 58 will press the pressure regulating lever 44 against the cutting blade 28 so as to constantly maintain the cutting edges 26 and 30 in a position so as to minimize the vertical distance between them.

Since, from the foregoing, the construction and advantages of this automatic shearing device is readily apparent, further description is believed to be unnecessary.

However, since numerous modifications will readily occur to those skilled in the art after a consideration of the foregoing specification and accompanying drawings, it is not intended to limit the invention to the precise embodiments of shearing, cutting and trimming device shown and described, but all suitable modifications and equivalents may be resorted to which fall within the scope of the appended claim.

Having described the invention, what is claimed as new is:

A shearing, cutting and trimming device comprising a casing having a power operated drive shaft therein, a fixed cutting blade rigidly secured on said casing, an elongated bearing block mounted in said casing, an operating lever pivotally mounted on said bearing block, a movable cutting blade secured on said operating lever and overlying said fixed cutting blade, an eccentric on said drive shaft, an extension engaging said eccentric, a screw secured in said casing and engaging said bearing block, a bearing element in said casing, a bearing recess in said bearing element, a bearing recess in said operating lever, a pressure regulating lever having ball terminals seated in said recesses, a tensioning step intermediate the ends of said lever, a pressure pin engaging said regulating lever, said regulating lever and said screw coacting to adjust the pressure at the cutting edges of said blade.

WILLIAM G. KAMMLADE, Jr.

REFERENCES CITED

The following references are of record in the file of this patent:

UNITED STATES PATENTS

| Number | Name | Date |
| --- | --- | --- |
| 492,818 | Melchoir | Mar. 7, 1893 |
| 736,854 | Long | Aug. 18, 1903 |
| 885,991 | Grace | Apr. 28, 1908 |
| 2,042,295 | Bristow | May 26, 1936 |
| 2,426,459 | Landen | Aug. 26, 1947 |